United States Patent
Kirillov

(10) Patent No.: US 11,269,065 B2
(45) Date of Patent: Mar. 8, 2022

(54) MUILTI-DETECTOR WITH INTERLEAVED PHOTODETECTOR ARRAYS AND ANALOG READOUT CIRCUITS FOR LIDAR RECEIVER

(71) Applicant: Infineon Technologies AG, Neubiberg (DE)

(72) Inventor: Boris Kirillov, Graz (AT)

(73) Assignee: Infineon Technologies AG

( * ) Notice: Subject to any disclaimer, the term of this patent is extended or adjusted under 35 U.S.C. 154(b) by 736 days.

(21) Appl. No.: 16/195,090

(22) Filed: Nov. 19, 2018

(65) Prior Publication Data

US 2020/0158832 A1    May 21, 2020

(51) Int. Cl.
  *G01S 7/481*  (2006.01)
  *G01S 7/486*  (2020.01)
  *G01S 7/4863* (2020.01)

(52) U.S. Cl.
  CPC .......... *G01S 7/4863* (2013.01); *G01S 7/4816* (2013.01)

(58) Field of Classification Search
  CPC ...... G01S 7/4863; G01S 7/4816; G01S 17/42; G01S 7/4815; G01S 7/4802
  USPC ...................................................... 356/5.01
  See application file for complete search history.

(56) References Cited

U.S. PATENT DOCUMENTS

| 9,857,473 | B2 | 1/2018 | Kim | |
| 2017/0307759 | A1* | 10/2017 | Pei | ............................ G06T 7/70 |
| 2019/0079166 | A1 | 3/2019 | Kim et al. | |

FOREIGN PATENT DOCUMENTS

| JP | 10062550 A | 3/1998 |
| JP | 2018059898 A | 4/2018 |
| KR | 1020150061330 A | 6/2015 |
| KR | 101931022 B1 | 12/2018 |
| KR | 20190030027 A | 3/2019 |

OTHER PUBLICATIONS

Yoo, Han Woong et al. "MEMS-basedlidar for autonomous driving." Elektrotech. Inftech.135, 408-415 (2018). https://doi.org/10.1007/s00502-018-0635-2.

* cited by examiner

*Primary Examiner* — Daniel L Murphy
(74) *Attorney, Agent, or Firm* — Design IP

(57) ABSTRACT

A Light Detection and Ranging (LIDAR) receiver includes a first lens system and a first detector module optically coupled to the first lens system. The first lens system is configured to transmit a reflected light beam to a plurality of receiving areas of the first detector module, where each of the plurality of receiving areas corresponds to a different set of receiving directions of the reflected light beam. The first detector module includes a first photodetector array and a first analog readout integrated circuit (IC) coupled to the first photodetector array, where the first photodetector array and the first analog readout IC are each arranged in a different one of the plurality of receiving areas of the first detector module. The LIDAR receiver further includes a second lens system adjacent to the first lens system, and a second detector module optically coupled to the second lens system.

26 Claims, 6 Drawing Sheets

MUILTI-DETECTOR WITH INTERLEAVED PHOTODETECTOR ARRAYS AND ANALOG READOUT CIRCUITS FOR LIDAR RECEIVER

FIELD

The present disclosure relates generally to Light Detection and Ranging (LIDAR) receivers and to methods for receiving a reflected light beam from a plurality of receiving directions, and, more particularly, to a LIDAR receiver with multiple detector modules.

BACKGROUND

Light Detection and Ranging (LIDAR), is a remote sensing method that uses light in the form of a pulsed laser to measure ranges (variable distances) to one or more objects in a field of view. In particular, a microelectromechanical systems (MEMS) mirror is used to scan light across the field of view. Arrays of photodetectors receive reflections from objects illuminated by the light, and the time it takes for the reflections to arrive at various sensors in the photodetector array is determined. This is also referred to as measuring time-of-flight (TOF). LIDAR systems form depth measurements and make distance measurements by mapping the distance to objects based on the time-of-flight computations. Thus, the time-of-flight computations can create distance and depth maps, which may be used to generate images.

A monolithic photodetector array is typically made up by adjacent photodetector columns arranged for receiving light. The photodetector array is also accompanied by readout electronics that is located outside from a light receiving area. Wiring is needed to connect the readout electronics to each of the photodetector columns, which requires gaps between the photodetector columns to allow space for the wiring and the connections made to the photodiodes or pixels of the array. This wiring structure creates a high impedance, complex topology, and limits the number of pixels that can be arranged for receiving light (i.e., it decreases the filling factor of the photodetector array).

Therefore, an improved device having a low impedance connection and a simpler topology while maintaining an adequate filling factor may be desirable.

SUMMARY

Embodiments provide a Light Detection and Ranging (LIDAR) receiver configured to receive a reflected light beam from a plurality of receiving directions. The LIDAR receiver includes a first lens system and a first detector module optically coupled to the first lens system. The first lens system is configured to transmit the reflected light beam to a plurality of receiving areas of the first detector module, where each of the plurality of receiving areas of the first detector module corresponds to a different set of receiving directions of the reflected light beam. The first detector module includes a first photodetector array and a first analog readout integrated circuit (IC) coupled to the first photodetector array, where the first photodetector array and the first analog readout IC are each arranged in a different one of the plurality of receiving areas of the first detector module. The LIDAR receiver further includes a second lens system adjacent to the first lens system, and a second detector module optically coupled to the second lens system. The second lens system is configured to transmit the reflected light beam to a plurality of receiving areas of the second detector module, where each of the plurality of receiving areas of the second detector module corresponds to a different set of receiving directions of the reflected light beam. The second detector module comprises a second photodetector array and a second analog readout IC coupled to the second photodetector array, where the second photodetector array and the second analog readout IC are each arranged in a different one of the plurality of receiving areas of the second detector module.

Embodiments further provide a LIDAR receiver configured to receive a reflected light beam from a plurality of receiving directions. The LIDAR receiver includes a first lens system and a first detector module optically coupled to the first lens system. The first lens system is configured to transmit the reflected light beam to a plurality of receiving areas of the first detector module, where each of the plurality of receiving areas of the first detector module corresponds to a different set of receiving directions of the reflected light beam. The first detector module includes a first plurality of photodetector arrays and a first plurality of analog readout integrated circuits (ICs) interleaved along a first direction with the first plurality of photodetector arrays, where each of the first plurality of analog readout ICs is coupled to a different one of the first plurality of photodetector arrays. The LIDAR receiver further includes a second lens system adjacent to the first lens system, and a second detector module optically coupled to the second lens system. The second lens system is configured to transmit the reflected light beam to a plurality of receiving areas of the second detector module, where each of the plurality of receiving areas of the second detector module corresponds to a different set of receiving directions of the reflected light beam.

Embodiments provide a method for receiving a reflected light beam from a plurality of receiving directions and implemented by a LIDAR system. The method includes receiving the reflected light beam at a first lens system and a second lens system; transmitting, by a first lens system, the received reflected light beam to a plurality of receiving areas of a first detector module, where each of the plurality of receiving areas of the first detector module corresponds to a different set of receiving directions of the reflected light beam, where the first detector module comprises a first photodetector array and a first analog readout integrated circuit (IC) coupled to the first photodetector array, and where the first photodetector array and the first analog readout IC are each arranged in a different one of the plurality of receiving areas of the first detector module; and transmitting, by a second lens system, the received reflected light beam to a plurality of receiving areas of the second detector module, where each of the plurality of receiving areas of the second detector module corresponds to a different set of receiving directions of the reflected light beam, where the second detector module comprises a second photodetector array and a second analog readout IC coupled to the second photodetector array, and where the second photodetector array and the second analog readout IC are each arranged in a different one of the plurality of receiving areas of the second detector module.

BRIEF DESCRIPTION OF THE DRAWINGS

Embodiments are described herein making reference to the appended drawings.

DETAILED DESCRIPTION

Figure 1A:
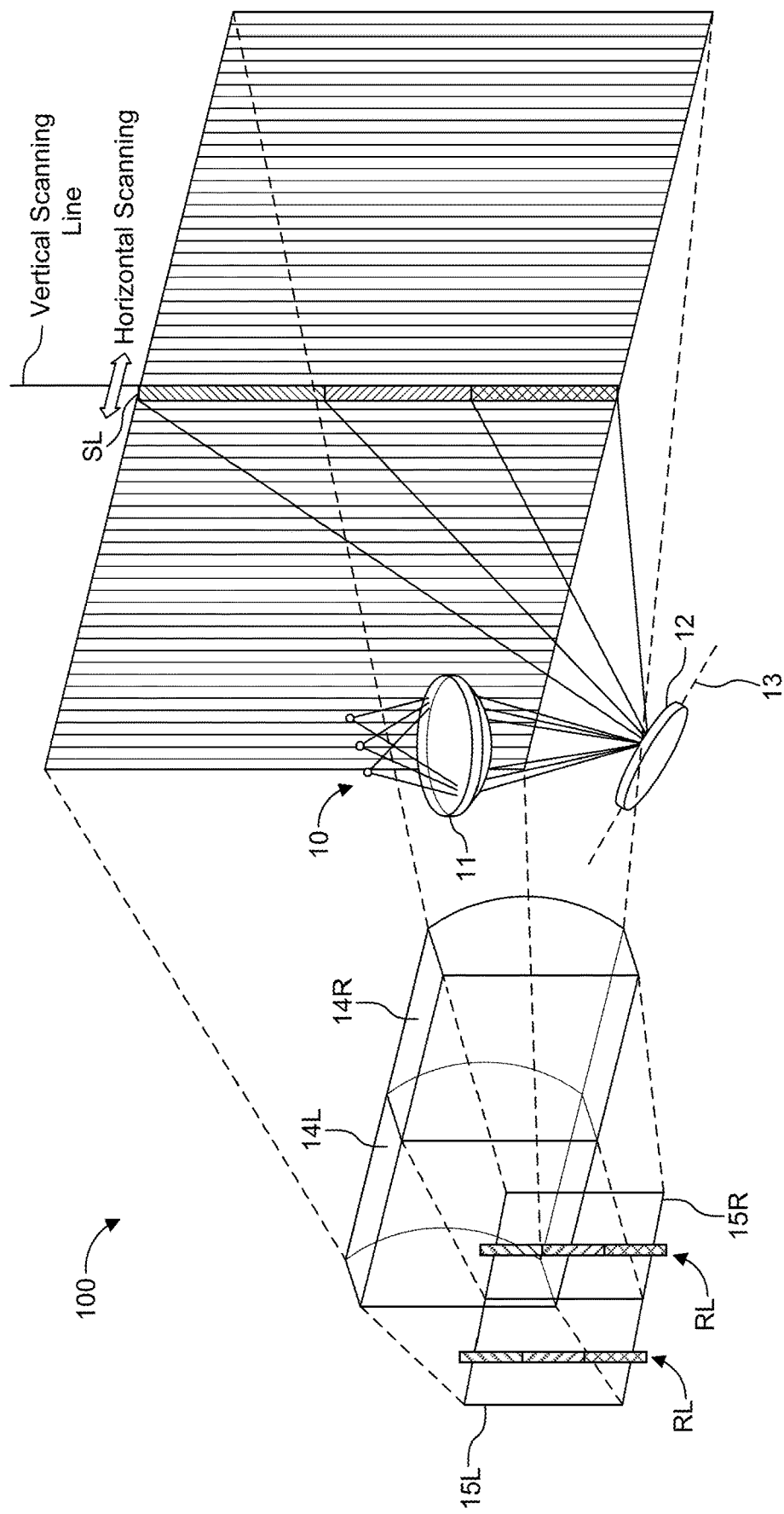
FIG. 1A is a schematic diagram of a Light Detection and Ranging (LIDAR) scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In LIDAR systems, a source transmits light pulses and/or beams into a field of view and the light reflects from one or more objects by backscattering. In particular, LIDAR is a direct Time-of-Flight (TOF) system in which the light pulses (e.g., laser pulses of infrared light) are emitted into the field of view, and a pixel array detects and measures the reflected pulses. For example, an array of photodetectors receive reflections from objects illuminated by the light.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted until a time the reflected light pulse is received at the receiver (i.e., at the pixel array). The "time-of-flight" of the light pulse is then translated into a distance.

A scan such as a oscillating horizontal scan (e.g., from left to right and right to left of a field of view) can illuminate a scene in a continuous scan fashion. By emitting successive light pulses in different scanning directions, an area referred to as the "field of view" can be scanned and objects within the area can be detected and imaged. A raster scan could also be used.

FIG. 1A is a schematic diagram of a LIDAR scanning system 100 in accordance with one or more embodiments. The LIDAR scanning system 100 is an optical scanning device that includes a transmitter, including an illumination unit 10, a transmitter optics 11, and a one-dimensional (1D) microelectromechanical systems (MEMS) mirror 12, and a receiver, including a first lens system 14L, a second lens system 14R, a first detector module 15L, and a second detector module 15R.

The first lens system 14L and the second lens system 14R are arranged adjacent to each other, but not necessarily contiguous to each other. In other words, there may be a gap in between the two lens systems. In any case, both lens systems are arranged at the receiver and are configured to receive reflected light simultaneously from a same receiving direction or set of receiving directions. That is, they are configured to receive the same reflected light beam being received at the receiver. Accordingly, the two lens systems may be identical to each other (i.e., made up of the same arrangement of lenses).

The first detector module 15L and the second detector module 15R are arranged on the backside of their respective lens system 14L or 14R to receive the same reflected light beam. In other words, the first detector module 15L receives the reflected light beam as a receiving line RL from the first lens system 14L, and the second detector module 15R receives the reflected light beam as a receiving line RL from the second lens system 14R. In each case, the receiving line RL is incident on both detector modules at a same respective receiving area. For example, if the receiving line RL is incident on exactly the center of the first detector module 15L, the receiving line RL would also be incident on exactly the center of the second detector module 15R. If the receiving line RL is incident on an area that is 5 mm right of center of the first detector module 15L, the receiving line RL would also be incident on an area 5 mm right of center of the second detector module 15R, and so on.

Thus, first detector module 15L and the second detector module 15R can be said to each have a plurality of receiving areas. The receiving areas of the first detector module and the receiving areas of the second detector module have a one-to-one correspondence with each other such that each of the plurality of receiving areas of the first detector module receives the reflected light beam simultaneously as a corresponding one of the plurality of receiving areas of the second detector module receives the reflected light beam.

As will be described in more detail below, the first detector module 15L includes at least one photodetector array and at least one analog readout circuit that are arranged in a different one of the plurality of receiving areas. Similarly, the second detector module 15R includes at least one photodetector array and at least one analog readout circuit that are arranged in a different one of the plurality of receiving areas. In each case, when one or both detector modules 15L and 15R include more than one photodetector array and more than one analog readout circuit, the photodetector arrays and the analog readout circuits are interleaved with one another, and are arranged in different ones of the plurality of receiving areas. Each photodetector array and analog readout circuit may be formed on a separate semiconductor die, and the analog readout circuits may be referred to as analog readout integrate circuits (ICs).

Figure 1B:
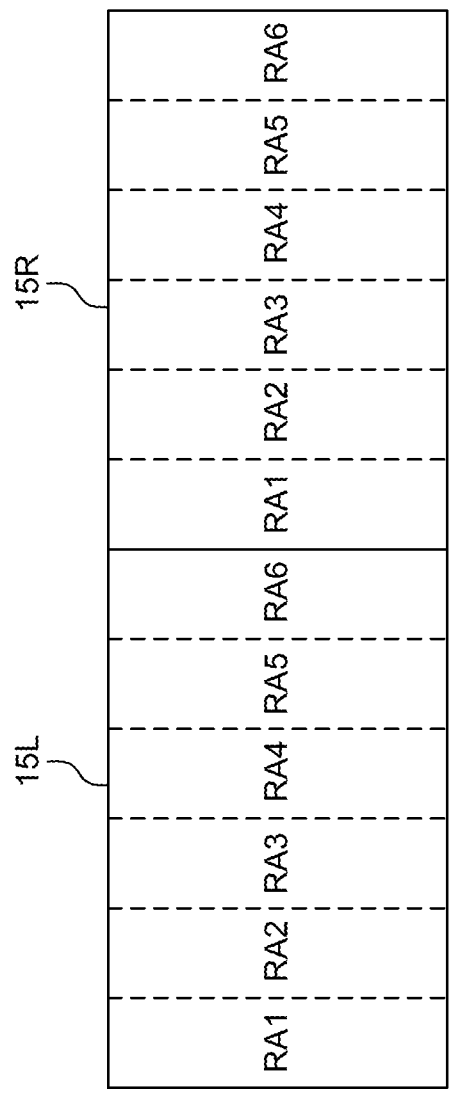
FIG. 1B shows a schematic block diagram of a first detector module and a second detector module of a LIDAR scanning system, each having receiving areas according to one or more embodiments.

FIG. 1B shows a schematic block diagram of the first detector module 15L and the second detector module 15R each including receiving areas RA1-RA6 according to one or more embodiments. While six receiving areas are shown, the detector modules may include more or fewer receiving areas based on the intended application. Also, while the first detector module 15L and the second detector module 15R are shown as being contiguous to each other, a gap in between the two detector modules may also be present. This holds true in FIG. 1A as well. In FIG. 1B, each receiving area RA1-RA6 of the first detector module 15L has a same spatial arrangement to a corresponding one of the receiving areas RA1-RA6 of the second detector module 15R. For example, the receiving area RA1 is spatially arranged at the same location (e.g., left edge) of both the first detector module 15L and the second detector module 15R. The receiving area RA2 also has the same spatial arrangement for both detector modules, and so on for receiving areas R3-R6.

In addition, each of the receiving areas RA1-RA6 corresponds to a different set of receiving directions of a reflected light beam. That is, receiving area RA1 for both detectors corresponds to a first set of receiving directions at which a reflected light beam may be received at the receiver, receiving area RA2 for both detectors corresponds to a second set of receiving directions at which a reflected light beam may be received at the receiver, receiving area RA3 for both detectors corresponds to a third set of receiving directions at which a reflected light beam may be received at the receiver, and so on.

Thus, when the reflected light beam is received at at least one of the first set of receiving directions, the receiving line RL will be incident on receiving area RA1 on both detector modules. When the reflected light beam is received at at least one of the second set of receiving directions, the receiving line RL will be incident on receiving area RA2 on both detector modules. When the reflected light beam is received at at least one of the third set of receiving directions, the receiving line RL will be incident on receiving area RA3 on both detector modules, and so on. Each set of receiving directions may include a same or a different number of receiving directions, and each set of receiving directions may include one receiving direction or more than one receiving direction.

In addition, neighboring sets of receiving directions may have a partial overlap. That is, they may have, for example, one common receiving direction and they may each have at least one different receiving direction from each other. Thus, receiving areas may also partially overlap.

As will be described below, the photodetector arrays and the analog readout circuits are separately arranged in one of the receiving areas RA1-RA6.

Turning back to FIG. 1A, the illumination unit 10 includes multiple light sources (e.g., laser diodes or light emitting diodes) that are linearly aligned in single bar formation and are configured to transmit light used for scanning an object. The light emitted by the light sources is typically infrared light although light with another wavelength might also be used. As can be seen in the embodiment of FIG. 1A, the shape of the light emitted by the light sources is spread in a direction perpendicular to the transmission direction to form a light beam with an oblong shape perpendicular to a transmission. The illumination light transmitted from the light sources is directed towards the transmitter optics 11 configured to focus each laser onto a one-dimensional MEMS mirror 12. The transmitter optics 11 may be, for example, a lens or a prism.

When reflected by the MEMS mirror 12, the light from the light sources is aligned vertically to form for each emitted laser shot a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple segments, where each segment corresponds to a respective light source. However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view.

Accordingly, the transmitter of the system 100 is an optical arrangement configured to generate laser beams based on the laser pulses, the laser beams having an oblong shape extending in a direction perpendicular to a transmission direction of the laser beams.

In addition, while three laser sources are shown, it will be appreciated that the number of laser sources are not limited thereto. For example the vertical scanning line SL may be generated by a single laser source, two laser sources, or more than three laser sources.

The MEMS mirror 12 is a mechanical moving mirror (i.e., a MEMS micro-mirror) integrated on a semiconductor chip (not illustrated). The MEMS mirror 12 according to this embodiment is suspended by mechanical springs or flexures (not illustrated) and is configured to rotate about a single axis and can be said to have only one degree of freedom for movement. Due to this single axis of rotation, the MEMS mirror 12 is referred to as a 1D MEMS mirror.

The MEMS mirror 12 is configured to oscillate "side-to-side" about a single scanning axis 13 at a resonance frequency such that the light reflected from the MEMS mirror 12 (i.e., the vertical scanning line of light) oscillates back and forth in a horizontal scanning direction. A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle of the MEMS mirror 12 on its scanning axis 13. For example, the MEMS mirror 12 may be configured to oscillate at a resonance frequency of 2 kHz, between +/−15 degrees to steer the light over 30 degrees making up the scanning range of the field of view. Thus, the field of view may be scanned, line-by-line, by a rotation of the MEMS mirror 12 through its degree of motion. One such sequence through the degree of motion (e.g., from −15 degrees to +15 degrees) is referred to as a single scan or scanning cycle. Multiple scans may be used to generate distance and depth maps, as well as 3D images by a processing unit. The horizontal resolution of the depth maps and images depends on the size of the incremental steps in rotation angle of the MEMS mirror 12 taken within the scans.

While the transmission mirror is described in the context of a MEMS mirror, it will be appreciated that other 1D mirrors can also be used. In addition, the resonance frequency or the degree of rotation is not limited to 2 kHz and +/−15 degrees, respectively, and both the resonance frequency and the field of view may be increased or decreased according to the application. Thus, a one-dimensional scanning mirror is configured to oscillate about a single scanning axis and direct the laser beams at different directions into a field of view. Hence, a transmission technique includes transmitting the beams of light into the field of view from a transmission mirror that oscillates about a single scanning axis such that the beams of light are projected as a vertical scanning line SL into the field of view that moves horizontally across the field of view as the transmission mirror oscillates about the single scanning axis.

Upon impinging one or more objects, the transmitted bar of vertical light is reflected by backscattering back towards the LIDAR scanning system 100 as a reflected vertical line where the first lens system 14L and the second lens system 14R receive the reflected light. The first lens system 14L and the second lens system 14R both direct the reflected light onto a respective one of the first detector module 15L and the second detector module 15R, each of which receive the reflected light as a receiving line RL. If the receiving line RL is incident on a photodetector array, the photodetector array is configured to generate electrical measurement signals. The electrical measurement signals may be used for generating a 3D map of the environment and/or other object data based on the reflected light (e.g., via TOF calculations and processing).

On the other hand, if the receiving line is incident on an analog readout circuit, no electrical measurement signals are generated by this analog readout circuit (i.e., by this detector module), since an analog readout circuit is not a photosensitive device. In other words, a location of an analog readout circuit in one of the receiving areas of a detector module results in a blind spot of that detector module.

However, the photodetector arrays and the analog readout circuits are arranged amongst the two detector modules 15L and 15R such that analog readout circuits are not arranged in a same receiving area of receiving areas R1-R6 in both detector modules. For example, if an analog readout circuit is located in receiving area R4 of the first detector module 15L, an analog readout circuit will not be located in receiving area R4 of the second detector module 15R. Instead, a photodetector array may be located in receiving area R4 of the second detector module 15R in order to compensate for the blind spot created by the analog readout circuit located in receiving area R4 of the first detector module 15L.

The receiving line RL is shown as a vertical column of light that extends along one of the pixel columns in a lengthwise direction of the pixel column. The receiving line has three regions that correspond to the vertical scanning line SL shown in FIG. 1A. As the vertical scanning line SL moves horizontally across the field of view, the vertical column of light RL incident on the two detector modules 15L and 15R also moves horizontally across both of the detector modules 15L and 15R. The reflected light beam RL moves from a first edge of each of the detector modules 15L and 15R to a second edge of each of the detector modules 15L and 15R as the receiving direction of the reflected light beam RL changes. The receiving direction, which may include a set of receiving directions, of the reflected light beam RL corresponds to a transmission direction of the scanning line SL.

Figure 1C:
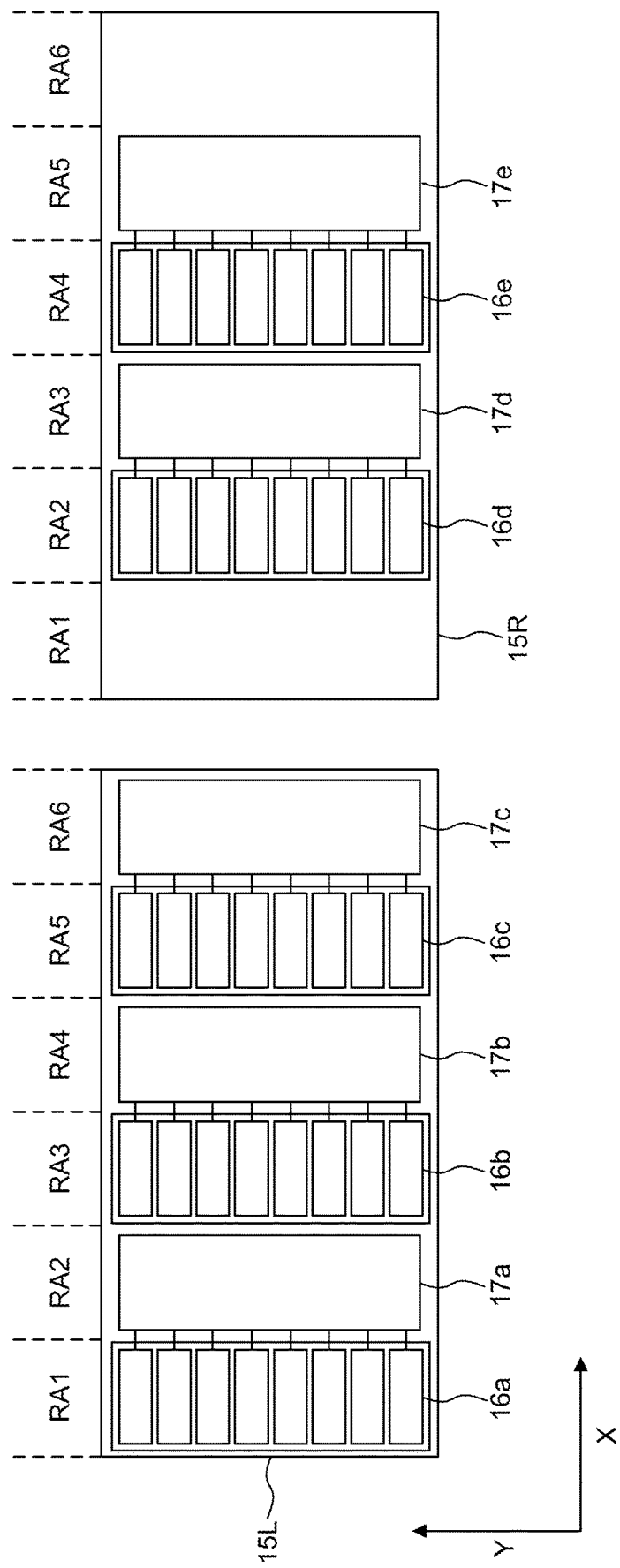
FIG. 1C illustrates a schematic block diagram of two detector modules of a LIDAR scanning system according to one or more embodiments.

FIG. 1C illustrates a schematic block diagram of two detector modules 15L and 15R according to one or more embodiments. In this example, the detector module 15L includes three photodetector arrays 16a, 16b, and 16c interleaved with three analog readout circuits 17a, 17b, and 17c along a first direction (i.e., x-direction). That is, the photodetector arrays 16a, 16b, and 16c and the analog readout circuits 17a, 17b, and 17c are arranged in an alternating arrangement with one another along the x-direction. Here, the photodetector arrays 16a, 16b, and 16c and the analog readout circuits 17a, 17b, and 17c are arranged in six receiving areas RA1-RA6 of the detector module 15L, as shown. Each of the photodetector arrays 16a, 16b, and 16c and the analog readout circuits 17a, 17b, and 17c may also be arranged on separate dies.

Moreover, the analog readout circuit 17a includes a plurality of output channels, each fixedly coupled to a corresponding one of the pixels of the photodetector array 16a to read out the electrical signals therefrom, the analog readout circuit 17b includes a plurality of output channels, each fixedly coupled to a corresponding one of the pixels of the photodetector array 16b to read out the electrical signals therefrom, and the analog readout circuit 17c includes a plurality of output channels, each fixedly coupled to a corresponding one of the pixels of the photodetector array 16c to read out the electrical signals therefrom. Thus, each photodetector array is paired with an analog readout circuit.

The detector module 15R includes two photodetector arrays 16d and 16e interleaved with two analog readout circuits 17d and 17e along the x-direction. That is, the photodetector arrays 16d and 16e and the analog readout circuits 17d and 17e are arranged in an alternating arrangement with one another along the x-direction. Here, the photodetector arrays 16d and 16d and the analog readout circuits 17d and 17e are arranged in four receiving areas RA2-RA5 of the detector module 15R, as shown.

Moreover, the analog readout circuit 17d includes a plurality of output channels, each fixedly coupled to a corresponding one of the pixels of the photodetector array 16d to read out the electrical signals therefrom, and the analog readout circuit 17e includes a plurality of output channels, each fixedly coupled to a corresponding one of the pixels of the photodetector array 16e to read out the electrical signals therefrom. Thus, each photodetector array is paired with an analog readout circuit.

As can be observed, the photodetector arrays 16a-16c of the detector module 15L are arranged in different receiving areas than the photodetector arrays 16d-16e of the detector module 15R. Similarly, the analog readout circuits 17a, 17b, and 17c of the detector module 15L are arranged in different receiving areas than the analog readout circuits 17d-17e of the detector module 15R. Accordingly, each detector module 15L and 15R is configured to compensate for the blind spots of the other that are the result of having analog readout circuits located in receiving areas of the respective detector modules.

In addition, each of the photodetector arrays 16a, 16b, and 16c have a first width (i.e., a width of the sensitive area of the photodetector array) in the x-direction. A gap between the photodetector arrays 16d-16e has a second width that is equal to or less than the first width. Since analog readout circuit 17d is disposed in the gap between photodetector arrays 16d-16e, the width of the readout circuit 17d is also equal to or less than the first width.

Similarly, each of the photodetector arrays 16d and 16e have the first width (i.e., a width of the sensitive area of the photodetector array) in the x-direction. A gap between the photodetector arrays 16a, 16b, and 16c has a second width that is equal to or less than the first width. Since analog readout circuits 17a and 17b are disposed in the gaps between photodetector arrays 16a-16b and 16b-16c, respectively, the width of the readout circuits 17a and 17b is also equal to or less than the first width. This spacing ensures that an area of a blind spot is not larger than a coverage area of the photodetector arrays used to compensate for that blind spot.

It will be appreciated that detector module 15L and detector module 15R are interchangeable with each other. In addition, each detector module 15L and 15R may have more or less photodetector array/analog readout circuit pairs than shown, while still being arranged to compensate for each other's blind spots. For example, detector module 15L may include a single photodetector array/analog readout circuit pair, while detector module 15R may include two photodetector array/analog readout circuit pairs. Alternatively, each detector module 15L and 15R may include the same number of photodetector array/analog readout circuit pairs.

It will also be appreciated that while the analog readout circuits are shown as being arranged to the right side of their paired photodetector array, they may alternatively be arranged to the left side of their paired photodetector array.

The photodetector arrays 16a-16e can be any of a number of photodetector types; including avalanche photodiodes (APD), photocells, and/or other photodiode devices. Imaging sensors such as charge-coupled devices (CCDs) can be the photodetectors. In the examples provided herein, the photodetector arrays 16a-16e are each a one-dimensional (1D) APD array that comprises a single column of APD pixels. Since the pixels are each fixedly (permanently) coupled to a respective output channel of a respective analog readout circuit, each pixel remains active (coupled) during an entire scanning operation. This is in contrast to an arrangement in which pixels are sequentially read out by selectively coupling and decoupling the pixels to a readout circuit based on which pixels are selected for read out.

The photodetector arrays 16a-16e are configured to receive reflected light pulses as the receiving line RL and generate electrical signals in response thereto. Since the time of transmission of each light pulse from the illumination unit 10 is known, and because the light travels at a known speed, a time-of-flight computation using the electrical signals can determine the distance of objects from detector modules 15L and 15R. A depth map can plot the distance information.

In one example, for each distance sampling, a microcontroller triggers a laser pulse from each of the light sources of the illumination unit 10 and also starts a timer in a Time-to-Digital Converter (TDC) Integrated Circuit (IC). The laser pulse is propagated through the transmission optics, reflected by the target field, and captured by the photodiodes of one of the photodetector arrays 16a-16e.

The photodiodes emit a short electrical pulse which is then amplified by an electrical signal amplifier. A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. By emitting successive light pulses in different directions established by the MEMS mirror, an area (i.e., a field of view) can be scanned, a three-dimensional image can be generated, and objects within the area can be detected.

Each detector module 15L and 15R is arranged in such a manner that an intended field of view is mapped on the 2D extension of the detector module 15L and 15R. In other words, the receiving areas RA1-RA6 are mapped to the intended field of view, the use of multiple photodetector arrays in the detector modules in staggered interleaved arrangements is the equivalent to a 2D photodetector array. Compared to the usage of a single 1D detector array in a focal plane of an optical system, the usage of a 2D photodetector array as described above allows to significantly reduce background light in a measurement since the background light from the field of view is now distributed amongst multiple columns. A received light beam however will hit only a specific column or specific columns of the 2D detector array depending on the horizontal position of the vertical scan line.

As noted above, each pixel of a photodetector array 16a-16e is fixedly coupled to one of the analog readout circuits 17a-17e. A pixel that is coupled to an analog readout circuit may be referred to as active. Thus, the pixels are always active during an entire scanning operation.

Each analog readout circuit 17a-17e includes N analog output channels, where N is the number of pixels in a pixel column. Each analog output channel is configured to read out measurement signals received from a coupled pixel.

These measurement signals are then transmitted to the processing and control unit for data processing, including the time-of-flight computations as described above. For example, the processing and control unit may include an analog-to-digital converter (ADC) for each photodiode and a field programmable gate array (FPGA) that record the time-of-flight.

When a pulse of laser energy as a vertical scanning line SL enters the field of view from the surface of MEMS mirror 12, reflected pulses appear when the laser light illuminates an object in the field of view. These reflected pulses arrive at the photodetector modules 15L and 15R as a vertical column of light that may, for example, have the width of one photodetector pixel and a length that spans vertically at least partially along a pixel column of the photodetector array 16a, 16b, 16c, 16d, or 16e in a lengthwise direction. That is, all photodetector pixels in a pixel column or a portion of the photodetector pixels of the pixel column may receive the bar of light. For example, in one instance, all light sources of the illumination unit 10 may be used to generate the scanning line SL/receiving line RL. In this case, the receiving line RL may extend along a full pixel column in the lengthwise direction. In another instance, only a subset of the light sources may be used to generate the scanning line SL/receiving line RL. In this case, the receiving line may extend along only a portion of the pixel column in the lengthwise direction.

In some instances, a pixel column and a neighboring analog readout circuit may receive light from a same bar of light (i.e., a same receiving line RL).

For example, this may occur when a portion of the received bar of light impinges on an area between a pixel column and a neighboring readout circuit. In this case, a pixel column in the other detector module that is in the same receiving area as the neighboring analog readout circuit would also receive the same receiving line, and would compensate for this blind spot. Thus, a pixel column in detector module 15L may be partially illuminated by a first portion of the receiving line RL while a pixel column in detector module 15R may be partially illuminated by a second, different portion of the receiving line RL. Using the detector modules 15L and 15R in FIG. 1C as an example, pixel column 16b and pixel column 16e may be partially illuminated by a receiving line RL when the receiving line RL impinges on an area between receiving areas RA3 and RA4.

On the other hand, if a partial vertical scanning line SL is generated by the illumination unit 10, as described above, then only a partial pixel column of the photodetector array 15a may be illuminated in a lengthwise direction.

Each photodetector array 16a-16e is configured to generate measurement signals (electrical signals) used for generating a 3D map of the environment based on the reflected light (e.g., via TOF calculations and processing). For example, as noted above, each photodetector array 16a-16e may be a 1D array of photodiodes or other light detection component capable of detecting and measuring light, and generating electrical signals therefrom. Each receiving pixel emits a short electrical pulse that is read out by a respective analog readout circuit 17a, 17b, 17c, 17d, or 17e.

Each signal that is read out from an analog readout circuit 17a, 17b, 17c, 17d, or 17e is then amplified by an electrical signal amplifier. A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. The microcontroller may trigger a next light pulse at the illumination unit 10 to scan a new field location. By emitting successive light pulses in different directions, an area can be scanned, a three-dimensional image can be generated, and objects within the area can be detected.

While not illustrated, the receiver of the LIDAR scanning system 100 may also include a digital micromirror device (DMD) and a secondary optics (e.g., a lens, a total internal reflection (TIR) prism, or a beam splitter) that are configured to initially receive the reflected light through the a lens system 14L or 14R, and redirect the received reflected light towards the detector module 15L or 15R. For example, a DMD would first receive the reflected light pulse from a lens system, and deflect the received reflected light through the secondary optics (e.g., a lens, a total internal reflection (TIR) prism, or a beam splitter) onto the detector module 15L or 15R. In this case, the detector modules 15L and 15R would still receive a vertical column of light RL, as described above.

Figure 2:
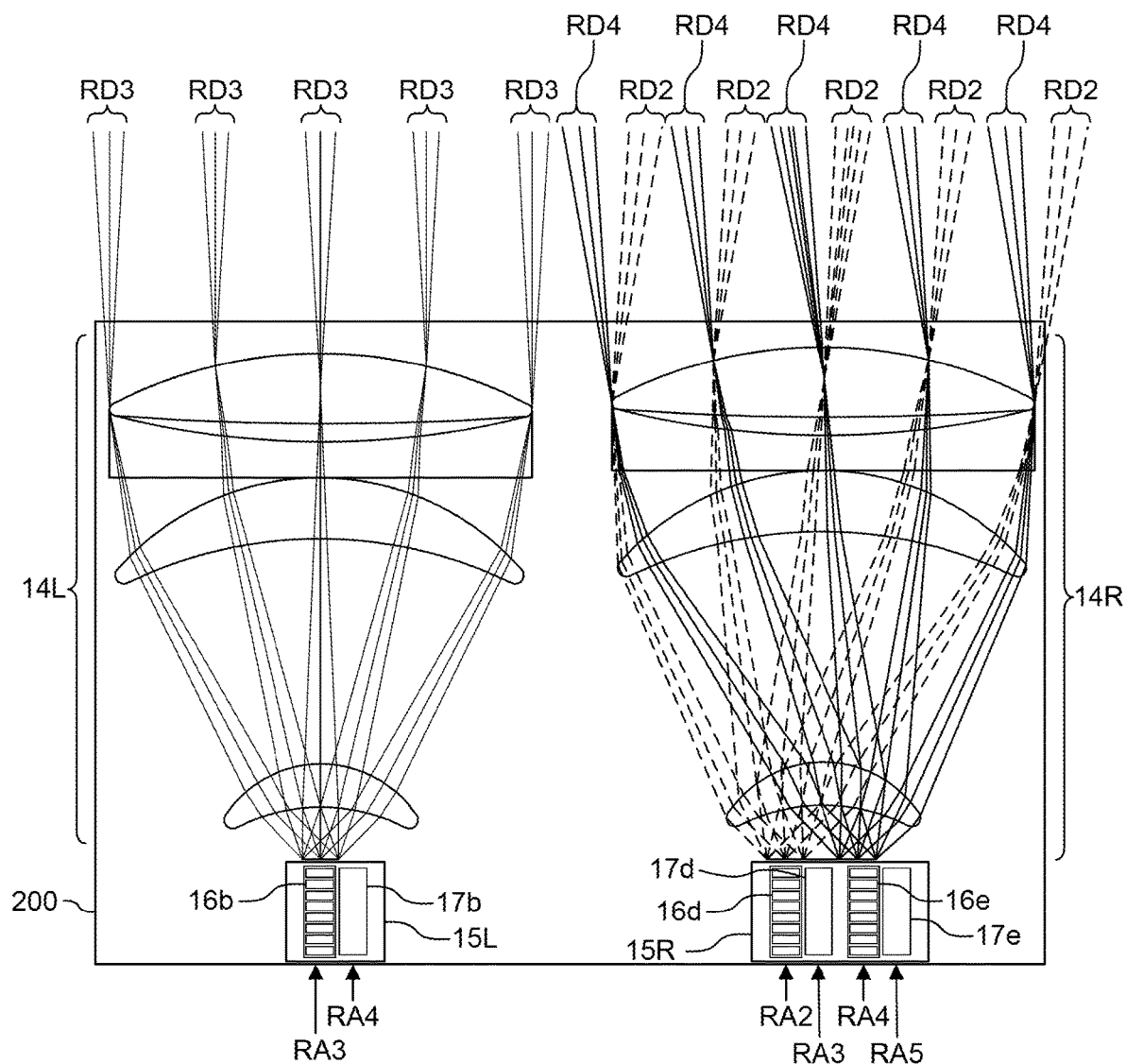
FIG. 2 shows a mix of plan and cross-sectional views of a receiver of a LIDAR scanning system according to one or more embodiments.

FIG. 2 shows a mix of plan and cross-sectional views of a receiver 200 of a LIDAR system according to one or more embodiments. The receiver 200 includes two lens systems 14L and 14R shown in a plan view (i.e., cut through its x-axis) and two detector modules 15L and 15R shown in a cross-sectional view (i.e., cut through its y-axis). The detector module 15L includes a photodetector array 16b and an analog readout circuit 17b, whereas the detector module 15R includes two photodetector arrays 16d and 16e and two analog readout circuits 17d and 17e.

The LIDAR receiver 200 is configured to receive a reflected light beam from a plurality of receiving directions, shown as reflected light coming into the LIDAR receiver 200.

The detector module 15L is optically coupled to the lens system 14L, which is configured to transmit the reflected light beam to a plurality of receiving areas RA1-RA5 of the detector module 15L, with receiving areas RA3 and RA4 being shown. Similarly, detector module 15R is optically coupled to the lens system 14R, which is configured to transmit the reflected light beam to a plurality of receiving areas RA1-RA5 of the detector module 15R, with receiving areas RA2-RA5 being shown.

Each of the plurality of receiving areas RA1-RA5 corresponds to a different set of receiving directions. For example, receiving area RA1 is located at the backside of the lens system 14L and lens system 14R such that it receives reflected light from a first set of receiving directions (not illustrated). That is, when the reflected light is received by the receiver 200 (i.e., by both lens systems 14L and 14R) from the first set of receiving directions, the reflected light beam will be incident on receiving area RA1 of both detector modules 15L and 15R. In this example, no element is provided at receiving area RA1. However, in other applications, a photodetector array or an analog readout circuit may be provided in receiving area RA1. This holds true for all examples in which a receiving area is "empty."

Receiving area RA2 is located at the backside of the lens system 14L and lens system 14R such that it receives reflected light from a second set of receiving directions RD2. That is, when the reflected light is received by the receiver 200 (i.e., by both lens systems 14L and 14R) from the second set of receiving directions RD2, the reflected light beam will be incident on receiving area RA2 of both detector modules 15L and 15R. In this case, the reflected light beam will be incident on the photodetector array 16d of the detector module 15R, and analog readout circuit 17d will read out electrical signals generated by the photodetector array 16d.

Receiving area RA3 is located at the backside of the lens system 14L and lens system 14R such that it receives reflected light from a third set of receiving directions RD3. That is, when the reflected light is received by the receiver 200 (i.e., by both lens systems 14L and 14R) from the third set of receiving directions RD3, the reflected light beam will be incident on receiving area RA3 of both detector modules 15L and 15R. In this case, the reflected light beam will be incident on the photodetector array 16b of the detector module 15L and on the analog readout circuit 17d of the detector module 15R. Analog readout circuit 17b will read out electrical signals generated by the photodetector array 16b.

Receiving area RA4 is located at the backside of the lens system 14L and lens system 14R such that it receives reflected light from a fourth set of receiving directions RD4. That is, when the reflected light is received by the receiver 200 (i.e., by both lens systems 14L and 14R) from the fourth set of receiving directions RD4, the reflected light beam will be incident on receiving area RA4 of both detector modules 15L and 15R. In this case, the reflected light beam will be incident on the photodetector array 16e of the detector module 15R and on the analog readout circuit 17b of the detector module 15L. Analog readout circuit 17e will read out electrical signals generated by the photodetector array 16e.

Receiving area RA5 is located at the backside of the lens system 14L and lens system 14R such that it receives reflected light from a firth set of receiving directions (not illustrated). That is, when the reflected light is received by the receiver 200 (i.e., by both lens systems 14L and 14R) from the fifth set of receiving directions, the reflected light beam will be incident on receiving area RA5 of both detector modules 15L and 15R. In this case, the reflected light beam will be incident on the analog readout circuit 17e of the detector module 15R.

In this example, a location of the analog readout circuit 17b results in a blind spot of the detector module 15L since the analog readout circuit 17b is not a photosensitive device. In addition, the locations of the analog readout circuits 17d and 17e result in a blind spots of the detector module 15R. However, since the photodetectors in each of the detector modules are located in different receiving areas, the photodetector(s) in detector module 15L are capable of compensating for the blind spots in detector module 15R, and vice versa. Thus, receiving the reflected light beam at a first one of the blind spot of detector module 15L or the blind spot of detector module 15R is mutually exclusive to receiving the reflected light beam at a second one of the blind spot of detector module 15R or the blind spot of detector module 15L.

Figure 3:
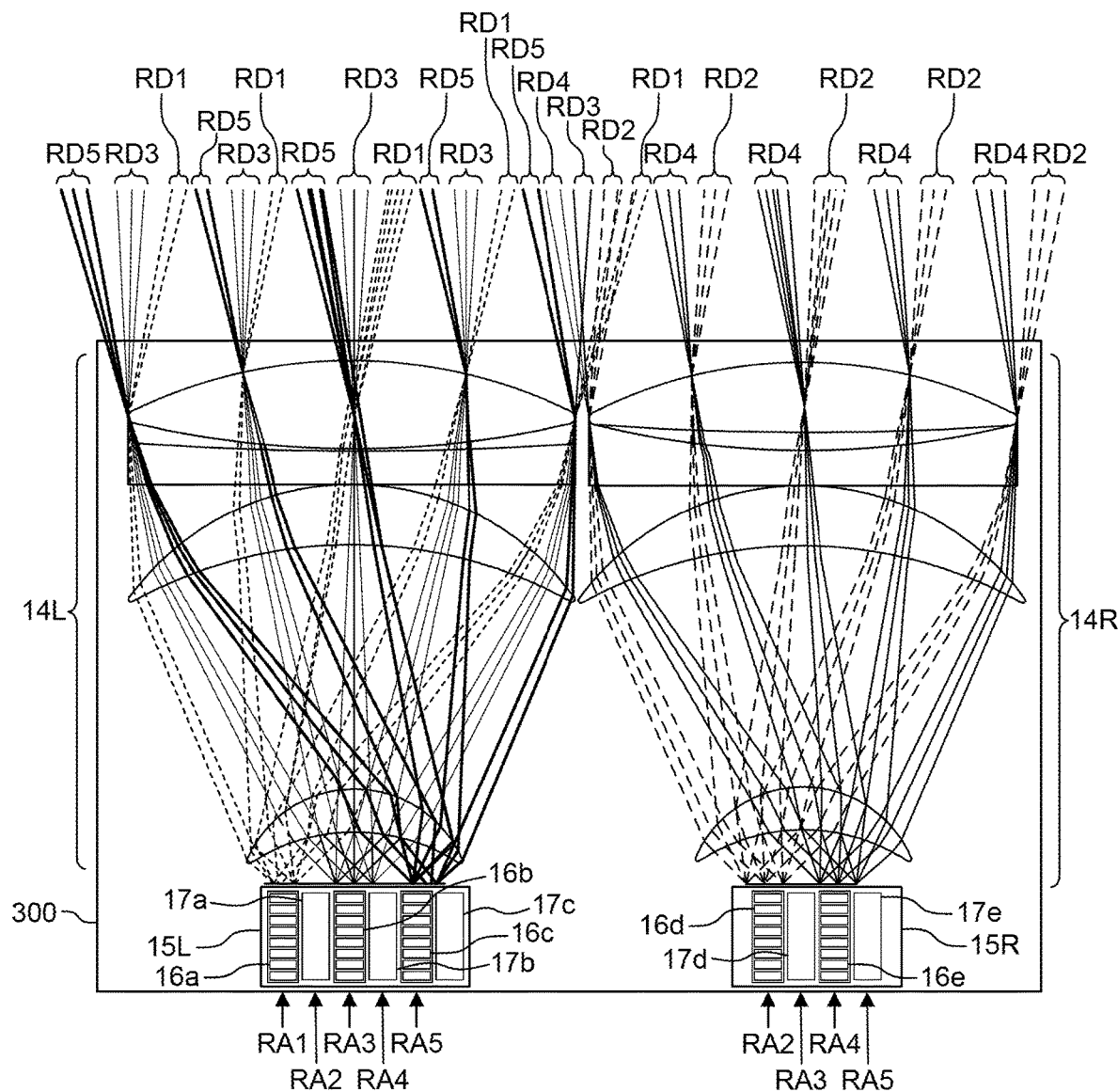
FIG. 3 shows a mix of plan and cross-sectional views of a receiver of a LIDAR scanning system according to one or more embodiments.

FIG. 3 shows a mix of plan and cross-sectional views of a receiver 300 of a LIDAR system according to one or more embodiments. The receiver 300 includes two lens systems 14L and 14R shown in a plan view (i.e., cut through its x-axis) and two detector modules 15L and 15R shown in a cross-sectional view (i.e., cut through its y-axis). The detector module 15L includes photodetector arrays 16a, 16b, and 16c and analog readout circuits 17a, 17b, and 17c, where elements 16a, 17a, 16b, 17b, and 16c are located in receiving areas RA1-RA5, respectively. In this example, analog readout circuit 17c is not located in a receiving area. In addition, detector module 15R includes two photodetector arrays 16d and 16e and two analog readout circuits 17d and 17e, where elements 16d, 17d, 16e, and 17e are located in receiving areas RA2-RA5, respectively. In this example, receiving area RA1 of detector module 15R does not include an element.

Furthermore, as similarly described in reference to FIG. 2, each of the plurality of receiving areas RA1-RA5 shown in FIG. 3 corresponds to a different set of receiving directions RD1-RD5, respectively. The photodetector arrays are arranged within the receiving areas RA1-RA5 such that as a reflected light beam is incident on one of the analog readout circuits (e.g., analog readout circuit 17a, 17b, 17d, or 17e) in one of the detector modules, a photodetector array (e.g., photodetector array 16b, 16c, 16d, or 16e) located in the other detector module also receives the reflected light beam. Thus, blind spots created by the analog readout circuits can be compensated by photodetector arrays located in the other detector module.

Based on the receiver 300 shown in FIG. 3, the detector module 15L is optically coupled to the lens system 14L, where the lens system 14L is configured to transmit the reflected light beam to a plurality of receiving areas RA1-RA5 of the detector module 15L. Each of the plurality of receiving areas RA1-RA5 corresponds to a different set of receiving directions RD1-RD5 of the reflected light beam. In addition, the detector module 15L includes a first plurality of photodetector arrays and a first plurality of analog readout ICs interleaved along a first direction (i.e., x-direction) with the first plurality of photodetector arrays, where each of the first plurality of analog readout ICs is coupled to a different one of the first plurality of photodetector arrays.

Similarly, the detector module 15R is optically coupled to the lens system 14R, where the lens system 14R is configured to transmit the reflected light beam to a plurality of receiving areas RA1-RA5 of the detector module 15R. Each of the plurality of receiving areas RA1-RA5 corresponds to a different set of receiving directions RD1-RD5 of the reflected light beam. In addition, the detector module 15R readout ICs interleaved along the first direction (i.e., x-direction) with the second plurality of photodetector arrays, where each of the second plurality of analog readout ICs is coupled to a different one of the second plurality of photodetector arrays.

Figure 4:
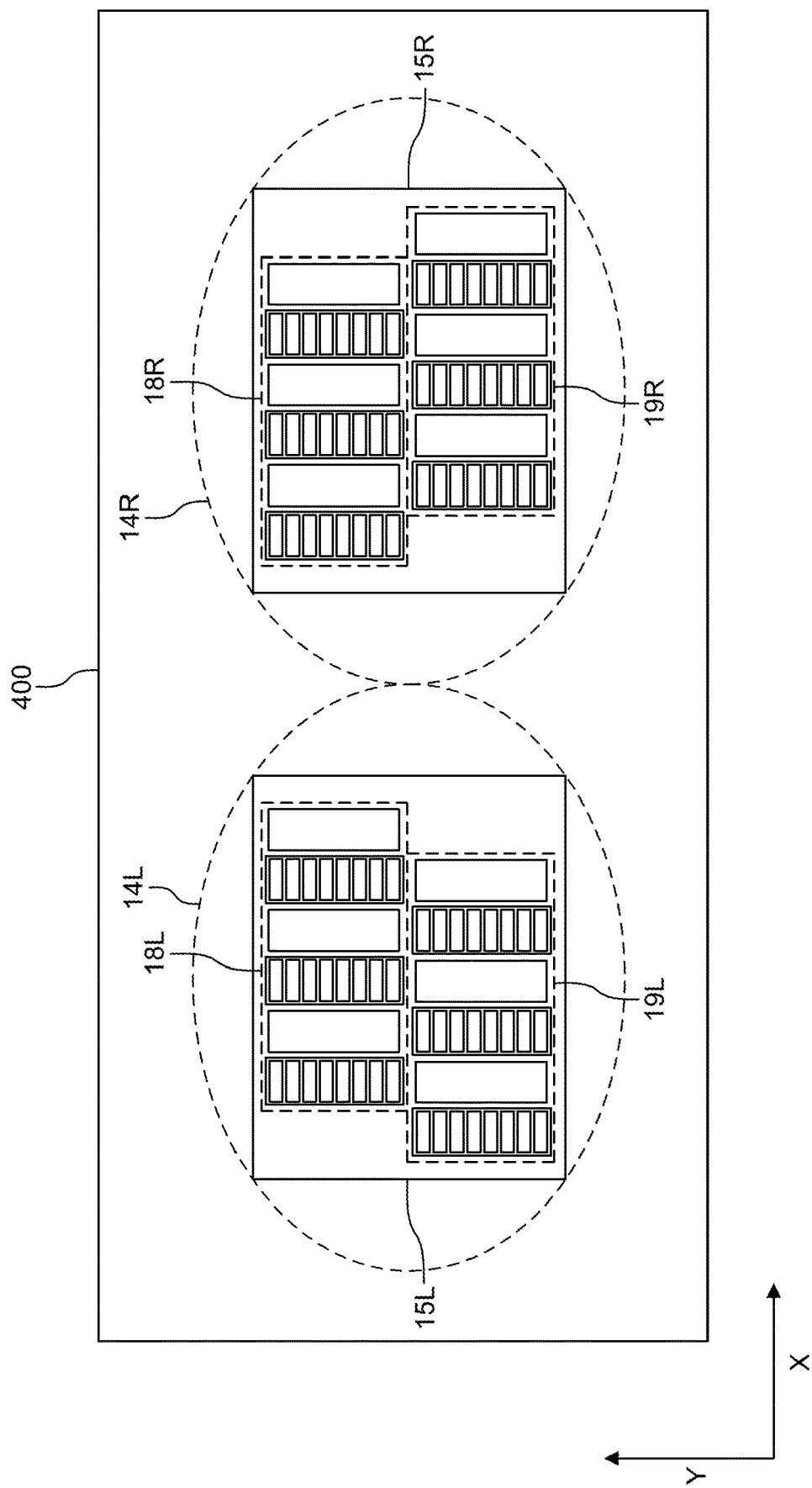
FIG. 4 shows a plan view of a receiver of a LIDAR scanning system according to one or more embodiments.

FIG. 4 shows a plan view of a receiver 400 of a LIDAR system according to one or more embodiments. The receiver 400 includes two lens systems 14L and 14R each disposed over two detector modules 15L and 15R, respectively. The lens systems 14L and 14R are illustrated with dashed lines to demonstrate their transparency to received reflected light. Thus, received reflected light is received by the lens systems 14L and 14R and transmitted therethrough to the detector modules 15L and 15R.

The detector module 15L is optically coupled to the lens system 14L, where the lens system 14L is configured to transmit the reflected light beam to a plurality of receiving areas of the detector module 15L. Similar to the embodiments described above, each of the plurality of receiving areas corresponds to a different set of receiving directions of the reflected light beam.

The detector module 15L includes a first sub-detector module 18L having a first plurality of photodetector arrays and a first plurality of analog readout circuits interleaved along a first direction (i.e., an x-direction) with the first plurality of photodetector arrays, where each of the first plurality of analog readout circuits is coupled to a different one of the first plurality of photodetector arrays. The first plurality of photodetector arrays and the first plurality of analog readout circuits are each arranged in a different one of the plurality of receiving areas of the detector module 15L.

The detector module 15R is optically coupled to the lens system 14R, where the lens system 14R is configured to transmit the reflected light beam to a plurality of receiving areas of the detector module 15R. Similar to the embodiments described above, each of the plurality of receiving areas corresponds to a different set of receiving directions of the reflected light beam.

The detector module 15R includes a first sub-detector module 18R having a second plurality of photodetector arrays and a second plurality of analog readout circuits interleaved along a first direction (i.e., an x-direction) with the second plurality of photodetector arrays, where each of the second plurality of analog readout circuits is coupled to a different one of the second plurality of photodetector arrays. The second plurality of photodetector arrays and the second plurality of analog readout circuits are each arranged in a different one of the plurality of receiving areas of the detector module 15R.

In addition, the detector module 15L includes a second sub-detector module 19L having a third plurality of photodetector arrays and a third plurality of analog readout circuits interleaved along the first direction (i.e., the x-direction) with the third plurality of photodetector arrays, where each of the third plurality of analog readout circuits is coupled to a different one of the third plurality of photodetector arrays. Furthermore, the third plurality of photodetector arrays and the third plurality of analog readout circuits are shifted in the first direction (i.e., the x-direction) with respect to the first plurality of photodetector arrays and the first plurality of analog readout circuits such that the first plurality of photodetector arrays are arranged adjacent to the third plurality of analog readout circuits in the second direction (i.e., the y-direction) that is orthogonal to the first direction (i.e., the x-direction).

In addition, the detector module 15R includes a second sub-detector module 19R having a fourth plurality of photodetector arrays and a fourth plurality of analog readout circuits interleaved along the first direction (i.e., the x-direction) with the fourth plurality of photodetector arrays, where each of the fourth plurality of analog readout circuits is coupled to a different one of the fourth plurality of photodetector arrays. Furthermore, the fourth plurality of photodetector arrays and the fourth plurality of analog readout circuits are shifted in the first direction (i.e., the x-direction) with respect to the second plurality of photodetector arrays and the second plurality of analog readout circuits such that the fourth plurality of photodetector arrays are arranged adjacent to the second plurality of analog readout circuits in the second direction (i.e., the y-direction) that is orthogonal to the first direction (i.e., the x-direction).

Based on this arrangement, first sub-detectors 18L and 18R are arranged such that the photodetector arrays thereof compensate for the blind spots of the other photodetector array that are created by the analog readout circuits being located in respective receiving areas. Likewise, second sub-detectors 19L and 19R are arranged such that the photodetector arrays thereof compensate for the blind spots of the other photodetector array that are created by the analog readout circuits being located in respective receiving areas.

In this example, the first plurality of photodetector arrays each have a first width in the first direction, the second plurality of photodetector arrays each have a second width in the first direction, gaps between the first plurality of photodetector arrays each have a third width in the first direction that is equal to or less than the second width, and gaps between the second plurality of photodetector arrays each have a fourth width in the first direction that is equal to or less than the first width.

In addition, the first plurality of photodetector arrays and the first plurality of analog readout circuits are each arranged in a different one of the plurality of receiving areas of the first detector module, and the second plurality of photodetector arrays and the second plurality of analog readout circuits are each arranged in a different one of the plurality of receiving areas of the second detector module. In particular, the first plurality of photodetector arrays are arranged in a first subset of the plurality of receiving areas of the first detector module that correspond to a first subset of the plurality of receiving areas of the second detector module in which the second plurality of analog readout circuits are arranged, and the second plurality of photodetector arrays are arranged in a second subset of the plurality of receiving areas of the second detector module that correspond to a second subset of the plurality of receiving areas of the first detector module in which the first plurality of analog readout circuits are arranged.

A method of receiving a reflected light beam from a plurality of receiving directions and implemented by a LIDAR system may include: receiving the reflected light beam at a first lens system and a second lens system; transmitting, by a first lens system, the received reflected light beam to a plurality of receiving areas of a first detector module, where each of the plurality of receiving areas of the first detector module corresponds to a different set of receiving directions of the reflected light beam, where the first detector module comprises a first photodetector array and a first analog readout IC coupled to the first photodetector array, and where the first photodetector array and the first analog readout IC are each arranged in a different one of the plurality of receiving areas of the first detector module; and transmitting, by a second lens system, the received reflected light beam to a plurality of receiving areas of the second detector module, where each of the plurality of receiving areas of the second detector module corresponds to a different set of receiving directions of the reflected light beam, where the second detector module comprises a second photodetector array and a second analog readout IC coupled to the second photodetector array, and where the second photodetector array and the second analog readout IC are each arranged in a different one of the plurality of receiving areas of the second detector module.

Although embodiments described herein relate to a MEMS device with a mirror, it is to be understood that other implementations may include optical devices other than MEMS mirror devices or other MEMS oscillating structures. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements. The above described exemplary embodiments are merely illustrative. It is understood that modifications and variations of the arrangements and the details described herein will be apparent to others skilled in the art. It is the intent, therefore, to be limited only by the scope of the appended patent claims and not by the specific details presented by way of description and explanation of the embodiments herein.

What is claimed is:

1. A Light Detection and Ranging (LIDAR) receiver configured to receive a reflected light beam from a plurality of receiving directions, the LIDAR receiver comprising:
a first lens system;
a first detector module optically coupled to the first lens system;
wherein the first lens system is configured to transmit the reflected light beam to a plurality of receiving areas of the first detector module, wherein each of the plurality of receiving areas of the first detector module corresponds to a different set of receiving directions of the reflected light beam, and
wherein the first detector module comprises a first photodetector array and a first analog readout integrated circuit (IC) coupled to the first photodetector array, wherein the first photodetector array and the first analog readout IC are each arranged in a different one of the plurality of receiving areas of the first detector module,
a second lens system adjacent to the first lens system; and
a second detector module optically coupled to the second lens system;
wherein the second lens system is configured to transmit the reflected light beam to a plurality of receiving areas of the second detector module, wherein each of the plurality of receiving areas of the second detector module corresponds to a different set of receiving directions of the reflected light beam, and
wherein the second detector module comprises a second photodetector array and a second analog readout IC coupled to the second photodetector array, wherein the second photodetector array and the second analog readout IC are each arranged in a different one of the plurality of receiving areas of the second detector module.

2. The LIDAR receiver of claim 1, wherein the first photodetector array and the second analog readout IC are arranged according to a first set of receiving directions such that the reflected light beam is incident on both the first photodetector array and the second analog readout IC when received from the first set of receiving directions, and the second photodetector array and the first analog readout IC are arranged according to a second set of receiving directions such that the reflected light beam is incident on both the second photodetector array and the first analog readout IC when received from the second set of receiving directions.

3. The LIDAR receiver of claim 1, wherein the first photodetector array and the second analog readout IC are arranged according to a first set of receiving directions such that the reflected light beam is incident on both the first photodetector array and the second analog readout IC when received from the first set of receiving directions, the second photodetector array is arranged according to a second set of receiving directions, and the first analog readout IC is arranged according to a third set of receiving directions.

4. The LIDAR receiver of claim 1, wherein:
the first photodetector array and the second analog readout IC are arranged in a first receiving area of the first and the second detector module, respectively, that corresponds to a first set of receiving directions, and
the second photodetector array and the first analog readout IC are arranged in a second receiving area of the first and the second detector module, respectively, that corresponds to a second set of receiving directions.

5. The LIDAR receiver of claim 1, wherein:
the first photodetector array and the second analog readout IC are arranged in a first receiving area of the first and the second detector module, respectively, that corresponds to a first set of receiving directions, and
the second photodetector array is arranged in a second receiving area of the second detector module that corresponds to a second set of receiving directions, wherein a second receiving area of the first detector module corresponds to the second set of receiving directions, and
the first analog readout IC is arranged in a third receiving area of the first detector module that corresponds to a third set of receiving directions.

6. The LIDAR receiver of claim 1, wherein the plurality of receiving areas of the first detector module and the plurality of receiving areas of the second detector module have a one-to-one correspondence with each other such that each of the plurality of receiving areas of the first detector module receives the reflected light beam simultaneously as a corresponding one of the plurality of receiving areas of the second detector module receives the reflected light beam.

7. The LIDAR receiver of claim 1, wherein:
the plurality of receiving areas of the first detector module are arranged at a backside of the first lens system according to a first spatial arrangement,
the plurality of receiving areas of the second detector module are arranged at a backside of the second lens system according to a second spatial arrangement, and
the first spatial arrangement and the second spatial arrangement are the same.

8. The LIDAR receiver of claim 1, wherein:
a location of the first analog readout IC results in a first blind spot of the first detector module,
a location of the second analog readout IC results in a second blind spot of the second detector module, and
receiving the reflected light beam at a first one of the first blind spot or the second blind spot is mutually exclusive to receiving the reflected light beam at a second one of the first blind spot or the second blind spot.

9. The LIDAR receiver of claim 1, wherein:
the second detector module comprises a third photodetector array and a third analog readout IC coupled to the third photodetector array, and
the third photodetector array and the third analog readout IC are each arranged in a different one of the plurality of receiving areas of the second detector module from the second photodetector array, the second analog readout IC, and each other.

10. The LIDAR receiver of claim 9, wherein the second analog readout IC is located in a receiving area of the plurality of receiving areas of the second detector module interposed between the second photodetector array and the third photodetector array.

11. The LIDAR receiver of claim 9, wherein:
the first, the second, and the third photodetector arrays have a first width, and
a gap between the second and the third photodetector arrays has a second width equal to or less than the first width.

12. The LIDAR receiver of claim 9, wherein:
the first photodetector array and the second analog readout IC are arranged according to a first set of receiving directions such that the reflected light beam is incident on both the first photodetector array and the second analog readout IC when received from the first set of receiving directions, and the first analog readout IC and the third photodetector
array are arranged according to a second set of receiving directions such that the reflected light beam is
incident on both the first analog readout IC and the third
photodetector array when received from the second set
of receiving directions.

13. The LIDAR receiver of claim 9, wherein the first
detector module comprises a fourth photodetector array and
a fourth analog readout IC coupled to the fourth photodetector array, wherein the fourth photodetector array and the
fourth analog readout IC are each arranged in a different one
of the plurality of receiving areas of the first detector module
from the first photodetector array, the first analog readout IC,
and each other.

14. The LIDAR receiver of claim 13, wherein the first
analog readout IC is located in a receiving area of the
plurality of receiving areas of the first detector module
interposed between the first photodetector array and the
fourth photodetector array.

15. The LIDAR receiver of claim 14, wherein:
the first, the second, the third, and the fourth photodetector arrays have a first width, and
a gap between the first and the second photodetector
arrays and a gap between the second and the third
photodetector arrays each have a second width equal to
or less than the first width.

16. The LIDAR receiver of claim 13, wherein:
the first photodetector array and the second analog readout IC are arranged according to a first set of receiving
directions such that the reflected light beam is incident
on both the first photodetector array and the second
analog readout IC when received from the first set of
receiving directions, and
the first analog readout IC and the third photodetector
array are arranged according to a second set of receiving directions such that the reflected light beam is
incident on both the first analog readout IC and the third
photodetector array when received from the second set
of receiving directions.

17. The LIDAR receiver of claim 16, wherein the third
analog readout IC and the fourth photodetector array are
arranged according to a third set of receiving directions such
that the reflected light beam is incident on both the third
analog readout IC and the fourth photodetector array when
received from the third set of receiving directions.

18. The LIDAR receiver of claim 1, wherein the first lens
system and the second lens system are identical.

19. The LIDAR receiver of claim 1, wherein:
the first and the second photodetector arrays are each a
single column of pixels configured to generate electrical signals based on the reflected light beam,
the first analog readout IC includes a first plurality of
output channels each fixedly coupled to a corresponding one of the pixels of the first photodetector array to
read out the electrical signals therefrom, and
the second analog readout IC includes a second plurality
of output channels each fixedly coupled to a corresponding one of the pixels of the second photodetector
array to read out the electrical signals therefrom.

20. A Light Detection and Ranging (LIDAR) receiver
configured to receive a reflected light beam from a plurality
of receiving directions, the LIDAR receiver comprising:
a first lens system;
a first detector module optically coupled to the first lens
system;
wherein the first lens system is configured to transmit the
reflected light beam to a plurality of receiving areas of
the first detector module, wherein each of the plurality
of receiving areas of the first detector module corresponds to a different set of receiving directions of the
reflected light beam, and
wherein the first detector module comprises a first plurality of photodetector arrays and a first plurality of
analog readout integrated circuits (ICs) interleaved
along a first direction with the first plurality of photodetector arrays, wherein each of the first plurality of
analog readout ICs is coupled to a different one of the
first plurality of photodetector arrays,
a second lens system adjacent to the first lens system; and
a second detector module optically coupled to the second
lens system;
wherein the second lens system is configured to transmit
the reflected light beam to a plurality of receiving areas
of the second detector module, wherein each of the
plurality of receiving areas of the second detector
module corresponds to a different set of receiving
directions of the reflected light beam.

21. The LIDAR receiver of claim 20, wherein the second
detector module comprises a second plurality of photodetector arrays and a second plurality of analog readout ICs
interleaved along the first direction with the second plurality
of photodetector arrays, wherein each of the second plurality
of analog readout ICs is coupled to a different one of the
second plurality of photodetector arrays.

22. The LIDAR receiver of claim 21, wherein:
the first plurality of photodetector arrays each have a first
width in the first direction,
the second plurality of photodetector arrays each have a
second width in the first direction,
gaps between the first plurality of photodetector arrays
each have a third width in the first direction that is equal
to or less than the second width, and
gaps between the second plurality of photodetector arrays
each have a fourth width in the first direction that is
equal to or less than the first width.

23. The LIDAR receiver of claim 21, wherein:
the first plurality of photodetector arrays and the first
plurality of analog readout ICs are each arranged in a
different one of the plurality of receiving areas of the
first detector module, and
the second plurality of photodetector arrays and the
second plurality of analog readout ICs are each
arranged in a different one of the plurality of receiving
areas of the second detector module.

24. The LIDAR receiver of claim 21, wherein:
the first plurality of photodetector arrays are arranged in
a first subset of the plurality of receiving areas of the
first detector module that correspond to a first subset of the plurality of receiving areas of the second detector module in which the second plurality of analog readout ICs are arranged, and the second plurality of photodetector arrays are arranged in a second subset of the plurality of receiving areas of the second detector module that correspond to a second subset of the plurality of receiving areas of the first detector module in which the first plurality of analog readout ICs are arranged.

25. The LIDAR receiver of claim 21, wherein:

the first detector module comprises a third plurality of photodetector arrays and a third plurality of analog readout ICs interleaved along the first direction with the third plurality of photodetector arrays, wherein each of the third plurality of analog readout ICs is coupled to a different one of the third plurality of photodetector arrays, the third plurality of photodetector arrays and the third plurality of analog readout ICs are shifted in the first direction with respect to the first plurality of photodetector arrays and the first plurality of analog readout ICs such that the first plurality of photodetector arrays are arranged adjacent to the third plurality of analog readout ICs in a second direction that is orthogonal to the first direction, the second detector module comprises a fourth plurality of photodetector arrays and a fourth plurality of analog readout ICs interleaved along the first direction with the fourth plurality of photodetector arrays, wherein each of the fourth plurality of analog readout ICs is coupled to a different one of the fourth plurality of photodetector arrays, and the fourth plurality of photodetector arrays and the fourth plurality of analog readout ICs are shifted in the first direction with respect to the second plurality of photodetector arrays and the second plurality of analog readout ICs such that the fourth plurality of photodetector arrays are arranged adjacent to the second plurality of analog readout ICs in the second direction.

26. A method of receiving a reflected light beam from a from a plurality of receiving directions and implemented by a Light Detection and Ranging (LIDAR) system, the method comprising:

receiving the reflected light beam at a first lens system and a second lens system;

transmitting, by a first lens system, the received reflected light beam to a plurality of receiving areas of a first detector module, wherein each of the plurality of receiving areas of the first detector module corresponds to a different set of receiving directions of the reflected light beam, wherein the first detector module comprises a first photodetector array and a first analog readout integrated circuit (IC) coupled to the first photodetector array, and wherein the first photodetector array and the first analog readout IC are each arranged in a different one of the plurality of receiving areas of the first detector module; and transmitting, by a second lens system, the received reflected light beam to a plurality of receiving areas of the second detector module, wherein each of the plurality of receiving areas of the second detector module corresponds to a different set of receiving directions of the reflected light beam, wherein the second detector module comprises a second photodetector array and a second analog readout IC coupled to the second photodetector array, and wherein the second photodetector array and the second analog readout IC are each arranged in a different one of the plurality of receiving areas of the second detector module.

* * * * *